No. 620,064. Patented Feb. 21, 1899.
J. F. VAN DERVORT.
ACETYLENE GAS GENERATOR.
(Application filed Mar. 10, 1898.)
(No Model.)

Witnesses.
Edwin F. McKee
Philip C. Masi

Inventor.
J. F. Van Dervort
by E. W. Anderson
his Attorney.

UNITED STATES PATENT OFFICE.

JOHN FRED. VAN DERVORT, OF TOPEKA, KANSAS.

ACETYLENE-GAS GENERATOR.

SPECIFICATION forming part of Letters Patent No. 620,064, dated February 21, 1899.

Application filed March 10, 1898. Serial No. 673,377. (No model.)

*To all whom it may concern:*

Be it known that I, JOHN FRED. VAN DERVORT, a citizen of the United States, and a resident of Topeka, in the county of Shawnee and State of Kansas, have invented certain new and useful Improvements in Apparatus for Generating Acetylene Gas; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
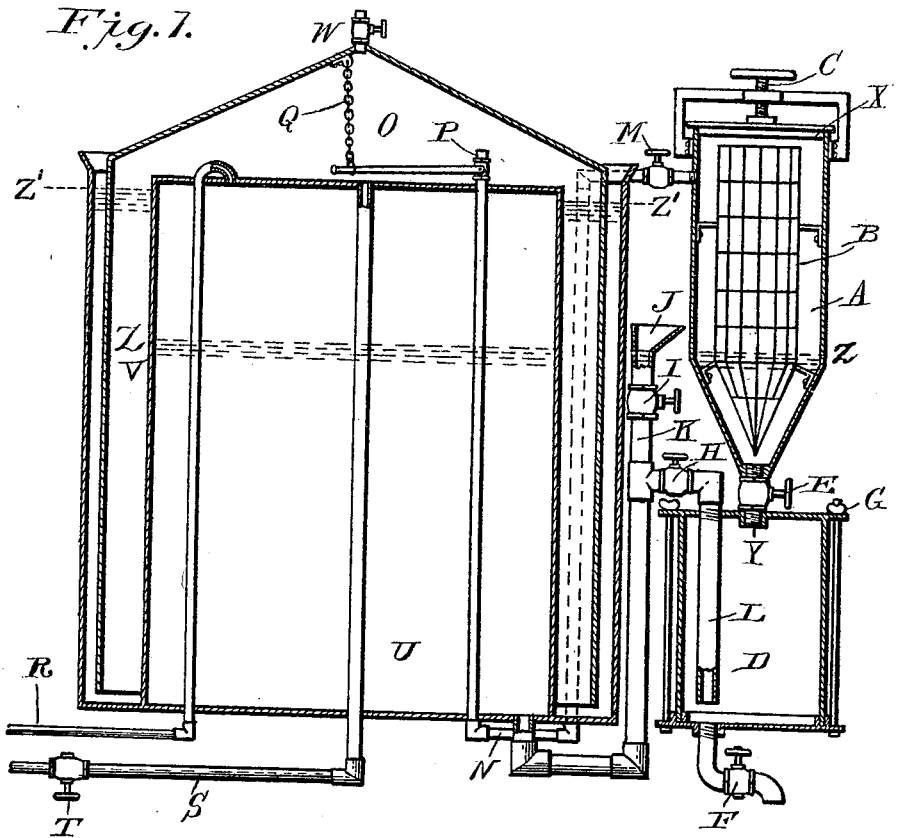
Figure 2:
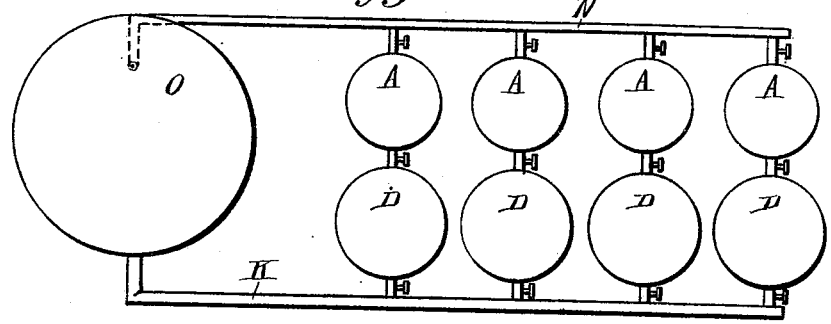

Figure 1 of the drawings is a vertical section of a generator and its adjuncts embodying my invention, and Fig. 2 is a diagrammatic view showing the arrangement of a battery of generators.

This invention has relation to apparatus for the generation of acetylene gas and is designed to provide apparatus of this character capable of operating in an efficient and practical manner and provided with means for the automatic control or regulation of the gas generation, whereby when the pressure of the generated gas reaches a predetermined point further generation is automatically caused to cease until the pressure is again reduced, when generation is resumed.

A further object is to provide means whereby in case of accident of any kind and generation of gas still continues after the pressure has reached the predetermined point the gas evolved is caused to escape into the atmosphere outside of the building.

Other objects and advantages of the invention will hereinafter appear.

With these objects in view the invention consists in the novel construction and combination of parts, all substantially as hereinafter described, and pointed out in the appended claims.

Referring to the accompanying drawings, the letter A designates a generating-chamber; B, an open-work basket to contain the charge of calcium carbid; D, a gas-trap chamber; U, a main water-supply tank, and O a gasometer.

The generating-chamber A contains the removable open-work basket B, in which the charge of calcium carbid is placed. This basket B is shaped at the bottom like an inverted cone or pyramid and is made with a space of one to three inches between the sides of the basket B and the sides of the generating-chamber A. This space is to allow room for the exhausted carbid to fall away from that remaining unexhausted in the basket B, and the basket B is made in the shape of an inverted cone at the bottom, so that the carbid will come in contact with the water in the form of a point, thus causing a slow generation of gas at first and avoiding the shock of a large generation of gas when the carbid first comes in contact with the water, and is also constructed in this shape to cause the carbid to settle downward toward the center of the bottom of the basket B, directly over the opening in the bottom of the generating-chamber A. Hence generation will take place at once upon the water entering the generating-chamber A through the pipe Y and will continue so long as any water remains in the generating-chamber. The generating-chamber A is connected with the gas-trap chamber D by means of the pipe Y, in which is located the two-way stop and waste cock E, which is so placed in the pipe Y as to drain the generating-chamber A whenever it is turned to close communication between said chamber and the gas-trap chamber. The gas-trap chamber D is connected by a pipe L with a pipe K through the top of the gas-trap chamber D. This pipe L extends downward to a point within a short distance of the bottom of the gas-trap chamber D. The bottom of the said chamber D is supplied with a faucet or stop-cock F, and this bottom may be made removable by loosening the thumb-screws G. The pipe K connects with the main water-supply tank U at the bottom of the same. This tank U is located within the gasometer O merely for the purpose of economizing in space and material and occupies the space within the gasometer usually given up to water alone.

The tank U is connected with the outside atmosphere by means of a pipe R, which serves the double purpose of an exit for the air in the tank U when tank U is being filled with water and also as an escape-pipe for any excess of gas that might be generated by accident, as hereinafter described.

The generating-chamber A is connected with the gasometer O by means of the gas-pipe N, which makes its exit from near the top of the generating-chamber A, then turns downward and passes on the outside of and under the gasometer O, and then turns upward, passing completely through the main supply-tank U and entering the gasometer above the tank U. The pipe N is arranged to be closed by means of a suitable valve P at or near its entrance into the gasometer O, said valve being arranged, by means of a chain Q or other suitable connection, to be closed by the rising of the top of the gasometer and to be opened by the sinking of the same. The gasometer O is connected with the gas-mains of the building by means of pipe S, which commences in the gasometer O above the tank U and passes downward completely through the tank U, thence from under the gasometer to the gas-main, and the pipe S is provided with a stop-cock T to shut the gas off from the mains for any cause.

The pipe N is provided with a stop-cock M to shut the gas completely out of the gasometer O, if so desired.

To place the apparatus in operation, fill the space V with water from the top of the gasometer until the space is filled to the level, as shown by the dotted lines Z' Z'. During this operation the air-cock W at the top of the gasometer is opened to allow the escape of the air. After this fill the tank U with water by means of the funnel J, located at the top extremity of pipe K, and have the stop-cock H in pipe L open, so that the gas-trap chamber D may fill with water, and also have the stop and waste cock E open, so that the water may enter the generating-chamber A through the pipe Y. Continue filling tank U through funnel J until it will contain no more, at which time the water-level will be the same in tank U and generating-chamber A, as shown by the dotted lines Z in both the tank U and the generating-chamber A. Now close valve I in pipe K to retain the water in the gas-trap chamber D when the generation of the gas commences. The machine is now ready to charge with carbid. To do this, turn valve E in pipe Y to close the communication with the gas-trap chamber, which will bring said valve into position to drain the water from the generating-chamber A. Loosen the screw-clamp C and remove the cover X from the generating-chamber A and remove the open-work basket B, placing the charge of carbid therein, and then replace basket B in the generating-chamber A. Then replace cover X, securing the same by means of a screw-clamp C or other suitable means, and see that valve M in pipe N is open to allow exit for the gas. Then open stop and waste cock E in pipe Y, which will allow the water to enter the generating-chamber A, and this water coming into contact with the carbid in basket B acetylene gas will be evolved, which will escape into the gasometer O through the pipe N. The evolution of gas will continue until the rising of the cover of the gasometer O closes the valve P, when the increased pressure of the gas in the generating-chamber A expels the water out of the generating-chamber into the gas-trap chamber D and replaces the water with gas, thus stopping the generation of gas. There will be no further generation of gas until the pressure in gasometer O is reduced by consumption, allowing the cover to sink until the valve P is opened, when the water in tank U will force the gas in the gas-trap chamber D upward through the pipe Y into the generating-chamber A, thence through pipe N into the gasometer O, replacing the gas in the generating-chamber A with water until the water comes in contact with the carbid. The whole operation is then repeated indefinitely until the carbid is exhausted, when the generating-chamber A may be recharged, as before. The faucet F in the bottom of the gas-trap chamber D is for the purpose of withdrawing the refuse matter from the gas-trap chamber D, which if there is no way of removing same would eventually clog the gas-trap chamber. The bottom of the gas-trap chamber D may be made removable for the purpose of cleansing if the faucet should prove insufficient for that purpose. It is removed by loosening the thumb-screws G, if made removable, when the entire bottom may be detached, giving access to the generating-chamber A both above and below, thus affording every facility to keep the apparatus clean. The valve H in pipe L may be closed when cleaning the apparatus to retain the water in tank U from wasting. The cover X of the generating-chamber A rests upon the gaskets to prevent leakage, as also does the bottom of the gas-trap chamber D rest on gaskets.

In case of an accident of any description happening after the valve P in the gasometer is closed and a quantity of gas should be evolved, the gas would first expel the water from the gas-trap chamber D, and if the evolution still continues the gas would find exit from the gas-trap chamber D through the pipe L into pipe K, thence into tank U, when it would bubble upward through the water to find exit into the outside atmosphere through the pipe R, which is connected with the outside of the building. Hence any excess of gas would be carried to the outside of the building and would finally escape. This pipe R should be covered at its outer extremity with No. 60 brass wire-gauze to prevent fire from traveling down the pipe R into the tank U and causing an explosion of gas. It is not likely that there will ever be any fire at the outer end of this pipe; but the wire-gauze is put on wholly as a precautionary measure and would prevent any damage in case this opening ever should be exposed to fire.

This apparatus can be arranged, as indicated in Fig. 2, so that there may be one, two, or more sets of generating-chambers A and gas-trap chambers D, with their connections so arranged that when the charge of carbid in one set is exhausted another set can be turned on, and so on until the whole is exhausted, when the entire apparatus can be recharged. In this way the apparatus will run for a considerable period of time without recharging and will afford a place of storage for the excess carbid kept on hand by the consumer, but not desired for immediate use.

Having thus described my invention, what I claim as new, and desire to secure by Letters Patent, is—

1. In a gas-generator of the class described, the combination of a generating-chamber, a holder or receptacle therein for carbid a gasometer, a water-tank inclosed therein, and independent of the water-space of the gasometer, a water-pipe leading from said tank and communicating with the bottom of the generating-chamber, an escape-pipe leading from the upper portion of the water-tank to the atmosphere outside of the building in which the generator is located, a gas-pipe leading from the generating-chamber to the gasometer, a valve for controlling the outlet of said pipe into the gasometer, and means whereby said valve is automatically closed when the pressure in the gasometer exceeds a predetermined degree, said water-tank and generating-chamber being so placed with respect to each other that they will have the same normal water-level, substantially as specified.

2. In a gas-generator of the class described, the combination of a generating-chamber, a holder or receptacle therein for the source of gas-supply, a gas-trap chamber with which the generating-chamber communicates at its lower end, a gasometer, a water-tank inclosed therein, a water-pipe leading from the said tank to the gas-trap chamber, a gas-pipe leading from the generating-chamber to the gasometer, an escape-pipe leading from the upper portion of the water-tank to the atmosphere outside of the building in which the generator is located, together with a valve for controlling the outlet of the gas-pipe into the gasometer and means whereby said valve is closed automatically when the pressure in the gasometer rises above a predetermined point, substantially as specified.

3. In a gas-generator of the class described, the combination of the generating-chamber A, the carbid-holder therein, the chamber D below the chamber A, the valved pipe Y connecting the said chambers, the gasometer, the closed water-tank therein, the pipe K communicating with the lower portion of said tank and having a filling-funnel at its opposite end, a valved pipe L connected to the pipe K and leading to the lower portion of the chamber D, a valve in the pipe K above the point where the pipe L communicates therewith, a gas-pipe leading from the upper portion of the chamber A to the upper portion of the gasometer, the valve P which controls the discharge of the said pipe, a connection between the said valve and the movable portion of the gasometer, and an escape-pipe leading from the upper portion of the water-tank to the atmosphere, substantially as specified.

In testimony whereof I affix my signature in presence of two witnesses.

JNO. FRED. VAN DERVORT.

Witnesses:
  M. J. MERCER,
  W. L. HOFER.